United States Patent [19]
Dill

[11] 3,750,151
[45] July 31, 1973

[54] THREE-PHASE ROTATING RING DISPLAY

[76] Inventor: Hans G. Dill, 2870 Tabago Pl., Costa Mesa, Calif.

[22] Filed: Aug. 25, 1971

[21] Appl. No.: 174,695

[52] U.S. Cl. .................. 340/379, 58/23 D, 335/219, 310/49 R, 340/325
[51] Int. Cl. ........................................ G04b 19/20
[58] Field of Search .................... 340/366 R, 378 R, 340/376, 379, 271, 324, 325, 378 MW; 310/49 R, 266, 156, 168; 116/115; 335/219, 209; 58/23 D, 126 R

[56] References Cited
UNITED STATES PATENTS

| | | | |
|---|---|---|---|
| 2,837,670 | 6/1958 | Thomas et al. | 310/49 R |
| 3,623,083 | 11/1971 | Fessler et al. | 340/366 R |
| 3,344,325 | 9/1967 | Sklaroff | 310/49 R X |
| 3,649,450 | 3/1972 | Barton | 340/271 X |
| 3,576,975 | 5/1971 | Maass | 310/49 X |
| 3,121,851 | 2/1964 | Packard | 310/266 X |
| 3,509,390 | 4/1970 | Loughlin et al. | 310/49 R X |
| 3,626,269 | 12/1971 | Stanley | 310/49 X |
| 3,391,289 | 7/1968 | Danilewicz et al. | 310/49 R X |

Primary Examiner—John W. Caldwell
Assistant Examiner—William M. Wannisky
Attorney—Joseph E. Szabo

[57] ABSTRACT

A data display device which includes an indicia-bearing rotor driven by three multiple stators. In one embodiment the three stators extend collectively around the rotor. In another embodiment, each stator extends fully around the rotor. The rotor carries a plurality of equally spaced-apart magnetic domains upon which the three stators act in succession. One of the magnetic domains is purposely omitted, however, to permit magnetic detection of a predetermined position of the rotor.

22 Claims, 15 Drawing Figures

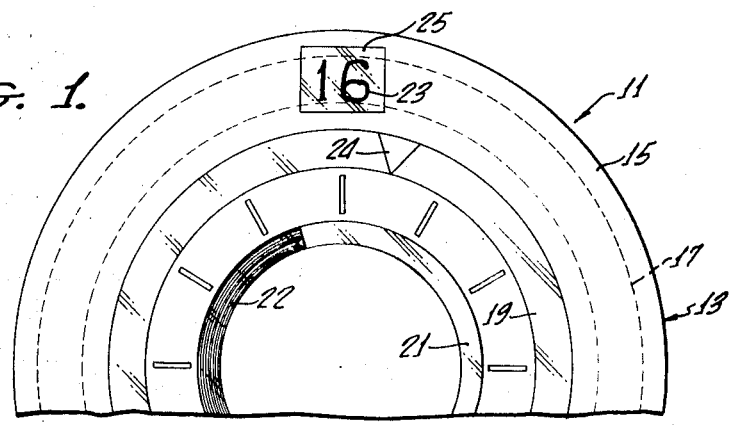
Fig. 1.
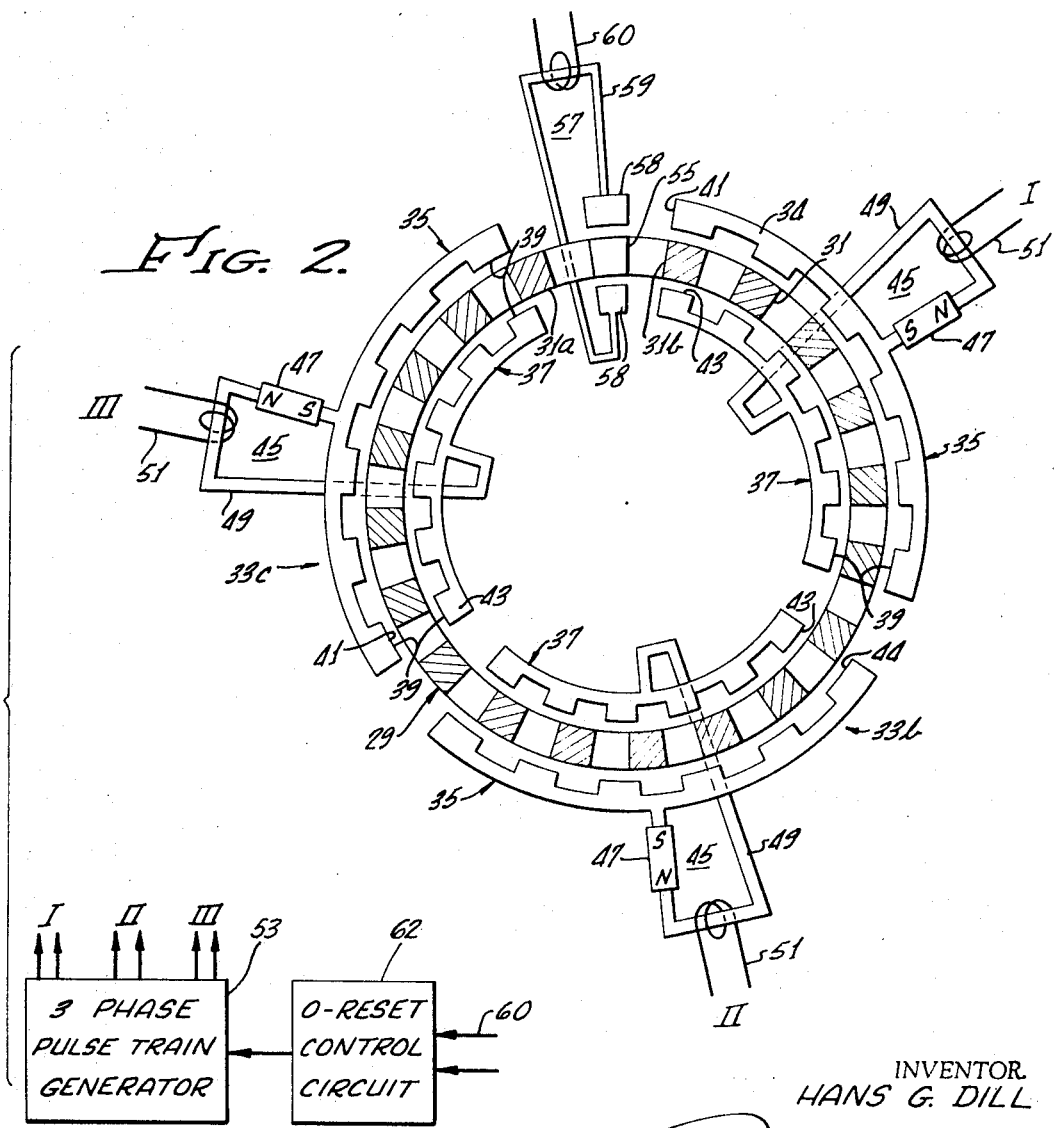
Fig. 2.
Fig. 2a.
INVENTOR.
HANS G. DILL

INVENTOR.
HANS G. DILL

BY

ATTORNEY.

INVENTOR.
HANS G. DILL
BY
ATTORNEY.

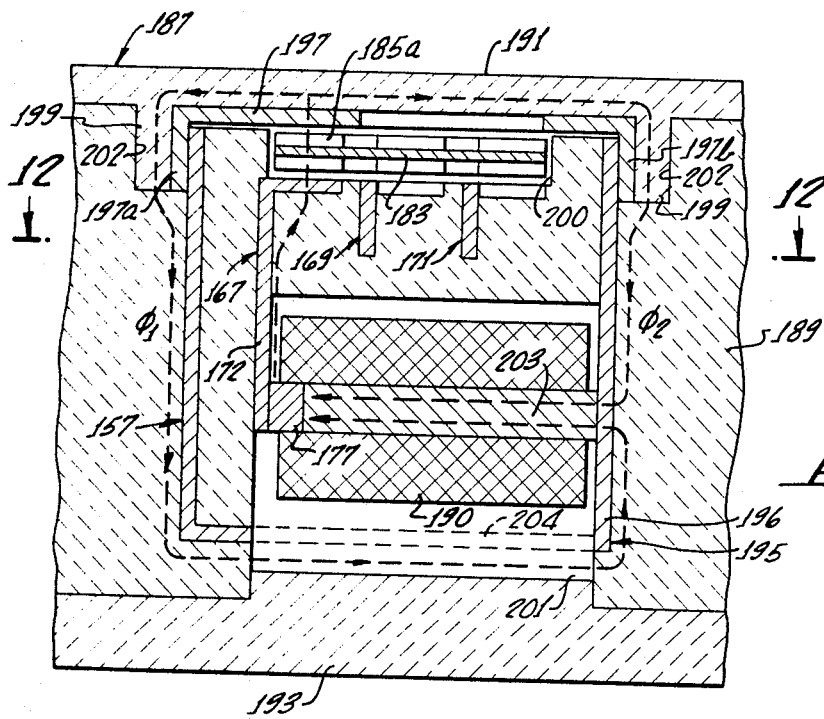
Fig. 11.
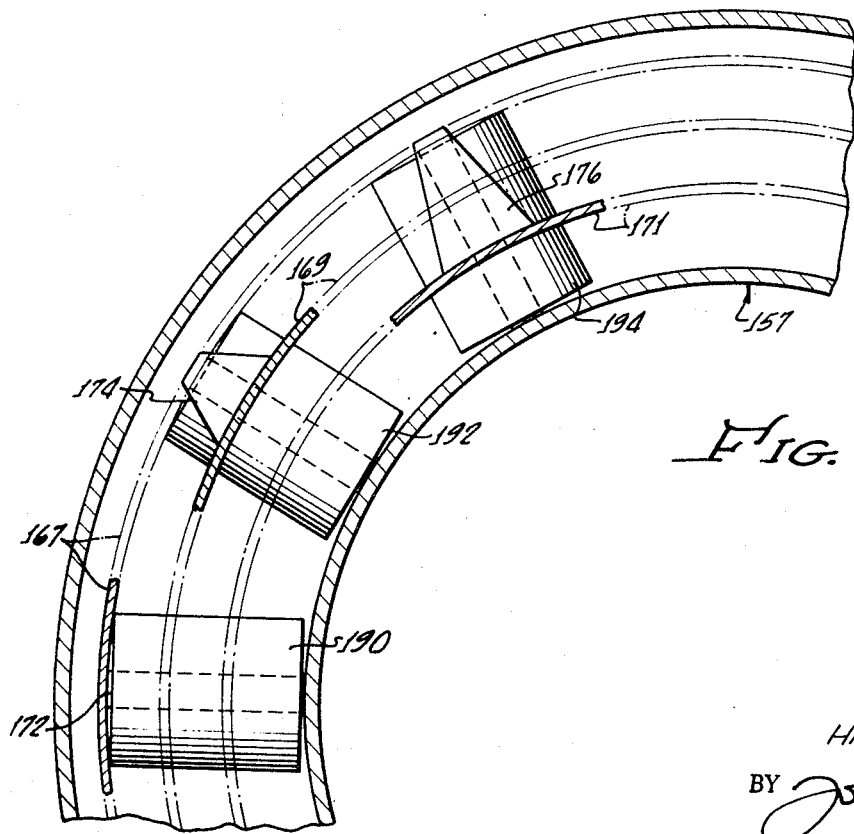
Fig. 12.
INVENTOR.
HANS G. DILL
BY 
ATTORNEY.

THREE-PHASE ROTATING RING DISPLAY

BACKGROUND OF THE INVENTION

There exists a need in many areas of technology to display digitally signalled data accurately, inexpensively, and reliably. One such area is in the field of timekeeping devices, and in particular, in electronic watches working on digital principles. A display device particularly designed for electronic watch applications, but also useful for displaying other types of data, is disclosed in patent application, Ser. No. 146,199, now U.S. Pat. No. 3,712,046, filed by Hans G. Dill on May 24, 1971, and entitled "Rotating Ring Display." The rotating ring display described in the referenced patent application includes a rotating ring, or rotor, carrying indicia which are to be displayed. The rotor is advanced in equal steps by an arrangement which includes a plurality of magnetic domains on the rotor and a plurality of driving means in the form of two or three magnetic stators distributed around the periphery of the rotor. Each stator includes a permanent magnet, with magnets being so distributed around the periphery of the ring as to hold it stably in a plurality of equally spaced rest positions. The stators also include electric coils wound thereon and energized in succession so as to modify the effect exerted by the magnets upon the magnetic domains, thereby causing a net thrust to be exerted on the rotor, driving it from a given one of its rest positions to the next such position. A particularly advantageous feature of the above arrangement is that no power is required to maintain the rotor in its rest positions, since this is achieved by the permanent magnets.

It is a principal object of the present invention to provide an improved information display device working on the above-described rotating ring principle.

A more specific object of the present invention is to provide a rotating ring display device which is highly stable in its rest positions without requiring expenditure of any power, and which requires a minimum of driving current to advance the ring through successive ones of such rest positions.

Another object of the present invention is to provide means for indicating when the rotating ring is in its reference or zero position, so as to permit the ring to be reset to such a position.

A further object of the invention is to optimize the magnetic coupling between the rotating ring and its stators.

Yet another object of the present invention is to provide a rotating ring display driven successively by three stators, each of which is symmetrically distributed fully around the ring so that the net force exerted by each of them upon the ring is purely rotational.

SUMMARY OF THE INVENTION

These and other objects of the invention are attained by a display device wherein an indicia-bearing rotor, carrying a plurality of spaced-apart magnetic domains (or areas) is surrounded by three multi-pole stators. Preferably, the magnetic domains are evenly distributed around the rotor and each stator has a plurality of arcuately distributed gaps through which the domains pass as the rotor turns and which become aligned with respective magnetic domains of the rotor at the same time. The gaps of all three stators do not become aligned with the rotor domains at the same time, however, Rather, they are so distributed about the periphery of the rotor that, as the rotor moves through successive "rest" positions, its domains become successively aligned with the gaps of respective ones of the three stators. Means are provided to maintain a magnetic field across the gaps of all three stators so that, as the rotor reaches successive ones of its rest positions, it is firmly held in those positions by the magnetic field of the particular stator with which its magnetic domains are aligned. One of the advantages of the present invention is that the rotor is held very firmly in its rest positions, this being the result of the simultaneous alignment of a plurality of its domains with a corresponding plurality of stator gaps. Preferably, the means for maintaining a magnetic field across the stator gaps includes a permanent magnet, so that no power need be consumed while the rotor is in one of its rest positions.

To advance the rotor from a given one of its rest positions to the next such position, means are provided to modulate the magnetization of the stators in cyclic succession. More specifically, in accordance with a preferred embodiment of the invention, each stator is provided with a coil which is so coupled to the stator that when the coil is energized, the magnetic field exerted by the permanent magnet across the stator gap is diminished and, preferably, neutralized. Moreover, the stators are so arranged that, when the gaps of one are aligned with the rotor domains, the other two stators are out of alignment with the rotor domains by equal but opposite amounts. As a result, with none of the stator coils energized, the aligned stator tends to hold the rotor in its rest position while the two non-aligned stators exert equal but opposite forces upon the rotor. Consequently, the rotor may be advanced from its rest position to the next such position by energizing the coil of one of the two non-aligned rotors so as to unbalance their opposed forces. Which of the two non-aligned stators is energized depends on the desired direction of rotation. Also, preferably the coil of the aligned stator is also energized so as to release its hold upon the rotor during the period when the rotor is to be advanced.

Another important advantage of the multi-pole stator arrangement of the present invention is that since each stator interacts with a plurality of rotor domains at the same time, with a typical number being four or more, it is possible to omit one of the rotor domains without adversely affecting the operation of the device. Omission of one of the rotor domains in turn makes it relatively imple to detect any predetermined position of the rotor by simply detecting the absent domain. This is very useful where it is desirable to reset the rotor to a zero position automatically.

A further advantage of the multi-pole stator arrangement is that it provides excellent shielding against external magnetic and electric fields.

The stators may be arranged in different ways in keeping with the invention. They may, for example, be distributed so that each extends about one-third around the periphery of the rotor. This results in an asymmetrical driving force upon the rotor and, hence, a lateral force upon the rotor bearing, since a different third of the rotor is driven during successive steps. It is worth noting, however, that by distributing the driving force around approximately one-third of the rotor, the multipole arrangement of the present invention reduces the lateral force which is exerted upon the rotor bearing as compared to what it would be if each stator had only a single pole.

Another feature of the present invention is an arrangement in which each stator extends fully around the rotor so that every time one of the stators is energized, the net force exerted upon the rotor is distributed symmetrically around it, thus eliminating any lateral thrust against its bearing.

BRIEF DESCRIPTION OF THE DRAWINGS

The invention will be described in greater detail by reference to the following drawings, in which:

FIG. 1 illustrates as one possible application of the present invention a multi-ring display device, with the rings being illustrated with various types of exemplary indicia;

FIG. 2 is a schematic diagram of a display device incorporating the present invention and characterized in that each of its three multiple stators extends approximately one-third around the periphery of its rotor;

FIG. 2a is a block diagram of an electronic drive circuit for energizing the coils of the FIG. 2 stators;

FIG. 11 is a cross-section along lines 11—11 of FIG. 10, showing in detail the manner in which such a device may be constructed;

FIG. 12 is a horizontal section taken along lines 12—12 of FIG. 11 and showing the locations of the several coils associated with the respective stators of the illustrated display device.

Figure 3:
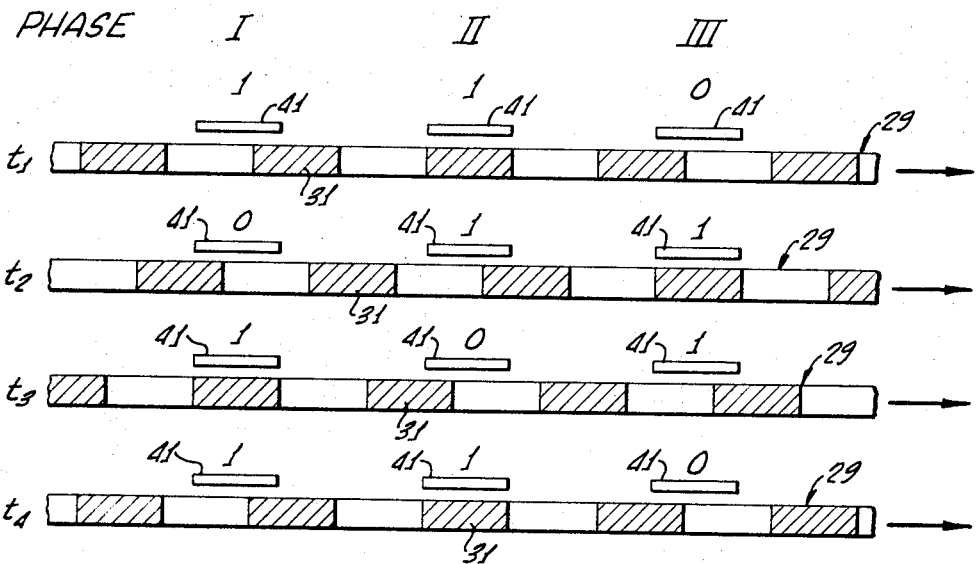
FIG. 3 is a sequential pulse timing diagram schematically showing the ring of FIG. 2 in four successive positions and the corresponding energization of its three stators.

While the invention has been shown and will be described in some detail with reference to preferred embodiments thereof, there is no intention that it must be limited to such detail. On the contrary, it is intended here to cover all modifications, alternatives, and equivalents falling within the spirit and scope of the invention as defined by the appended claims.

DESCRIPTION OF THE PREFERRED EMBODIMENTS

Turning now to the figures, an exemplary application of the present invention is the multi-ring display 11 illustrated in FIG. 1. As shown in FIG. 1, the exemplary diaplay 11 may include a casing 13 supporting a dial 15, below which a plurality of rings 17, 19, and 21 are rotatably supported in a concentric relationship. Preferably, although not necessarily, each of the rings is separately sealed in the casing 13, being held in individual concentric grooves. Each of the rings is marked with indicia which may take the form of a moving circular band 22, or a pointer 24, both of them being read against a stationary scale on the dial, or it may take the form of a number, 23, which is displayed through a transparent window 25 in an otherwise opaque lens. Naturally, any combination of such indicia may be employed, as illustrated in FIG. 1.

The present invention is directed primarily to the manner of driving each of the respective rings 17, 19, and 21. It will be understood, of course, that while the display device of the present invention may employ several concentric rings, as suggested by FIG. 1, it need not necessarily do so and that it may employ a single such ring, or several concentric rings. For sake of simplicity, a display device 27 illustrated schematically in FIG. 2 is shown as having only a single ring. The device 27 is comprised principally of a rotor or ring 29, carrying a plurality of magnetic domains 31, which are preferably evenly distributed. Since the nature of the rotor 29 will be discussed in greater detail, it is sufficient, at this point, to understand that the magnetic domains 31 are regions on the rotor 29 which provide a better flux path than other areas of the rotor.

It should be clearly understood that the phrase, "magnetic domain" is not being used herein to describe a unidirectionally saturated ferromagnetic crystal, a meaning which that phrase has acquired in theoretical physics.

Extending along the periphery of the rotor 29 are three stators 33a, 33b, and 33c, each of which runs approximately one-third around the periphery of the ring. Generally, the stators 33a–33c are actuated with three different phases of driving current and serve successively to advance the rotor 29 from a given one of its rest positions to the next such position. In the exemplary embodiment illustrated in FIG. 2, each of the stators 33a–33c includes a first pole piece 35 and a second pole piece 37 having a plurality of teeth 41 and 43 extending toward one another. Each pair of teeth 41 and 43 together define a stator pole 41,43, having a gap therein, and the series of such tooth pairs 41,43 of each stator define a plurality of arcuately distributed spaced-apart gaps 39 through which the rotor magnetic domains 31 move as the rotor is advanced. The term "gap" is used in the specification and claims to denote an air space across which a magnetic stator produces a magnetic field, regardless of the particular stator geometry used to create the space and the field. In order to cause such a magnetic field to appear simultaneously across the several gaps 39 of a given stator, each such stator is provided with means 45 for magnetizing it. Such means is shown to include a permanent magnet 47 and a magnetic member 49 for applying the magnetic field of the magnet across the pole pieces 35 and 37 of the stator. Means are also provided for modulating the magnetic field applied by the magnet 47 across the gaps 39, this being shown in the form of a coil 51 wound around the magnetic member 49 which is connected at one of its ends to the stator pole piece 35 and at its opposite end to the stator pole piece 37.

To advance the rotor 29, a current pulse is applied to the respective coils 51 marked respectively I, II, and III from a three-phase pulse train generator 53. The details of such a generator need not be described, since anyone skilled in the art of electronics will be able to construct one, given the necessary phase relationships of the pulse trains which are to be applied to the respective coils 51. These phase relationships are shown in FIG. 3, in which the position of the rotor 29 is shown at four successive times, $t_1$, $t_2$, $t_3$, and $t_4$. The successive positions of the ring are shown in relation to the position of the stator pole fingers 41, of which one is shown for each of the three stators 33a, 33b, and 33c, and which are respectively identified by the phase-representative symbol I, II, and III.

Before proceeding further, it will be helpful in understanding the following discussion to observe the positions of the respective stators 33a–33c relative to the rotor 29. Thus, it will be noted that the phase I stator 33a has its pole teeth 41 and 43 in alignment with the rotor domains 31, which extend between them. At the same time, the phase II and phase III stators 33b and 33c are out of alignment with the magnetic domains which extend between respective ones of them by equal and opposite amounts. In particular, the phase II stator 33b has its poles 41, 43 ahead of the magnetic domains 31 which lie between them, and this "lead" is two-thirds of the peripheral extent of one of the magnetic domains. Conversely, the phase III stator 33c has its poles 41, 43 lagging the magnetic domains 31 lying between them, by two-thirds of the peripheral extent of a domain. The above lag and lead figures assume a clockwise advancement of the rotor 29. Accordingly, when none of the stator coils 51 is energized, the phase I stator 33a will securely hold the ring 29, due to the fact that its domains 31 are aligned with the poles 41, 43 of the stator. Moreover, the permanent magnetic fields which exist between the poles of the phase II and phase III stators 33b and 33c, will exert equal but opposite rotational forces upon the ring 29, so that the rotor remains stationary. All that is necessary, then, to advance the rotor 29 is to unbalance the forces which are exerted upon it by the phase II and phase III stators 33b and 33c. While not essential, it is desirable also, at the same time, to diminish and preferably eliminate the holding effect of the phase I stator 33a, in order to permit the rotor to move more easily.

To advance the rotor 29 from the reset position in which it is illustrated in FIG. 2 to its next rest position, all that is necessary is to apply a current pulse to the coils 51 of the phase I and phase III stators, the pulses being in a direction such that the magnetic field of the respective permanent magnet 47 across the gaps of those stators is diminished. This will result in a clockwise advancement of the rotor 29, since the force exerted by the phase II stator 33b, tending to move the rotor clockwise, will be greater than the corresponding force exerted by the phase III stator 33c, whose effect would normally be to urge the ring 29 counterclockwise. This state of affairs is illustrated in FIG. 3 as occurring at time $t_3$, where a magnetic domain 31 is shown to be in alignment with the pole tooth 41 of the phase I stator and where a pulse is shown to be applied to the phase I and phase III coils, but not to the phase II coil, this being indicated by the numeral (1) next to the phase I and phase III pole teeth 41 and by the numeral (0) next to the phase II pole 41.

The position reached by the ring 29 after the application of the aforementioned current pulses is shown at time $t_4$ in FIG. 3 to be such that the pole teeth 41 of the phase II stator are in alignment with the rotor domains 31. Accordingly, the next combination of pulses is such that the coils 51 associated with the phase I and phase II stators 33a and 33b are energized. Hence, by the same reasoning advanced hereinabove with reference to the previous position of the ring 29, it is rotated through an angle corresponding to two-thirds of the angle occupied by a domain 31 under the attractive force of the phase III stator 33c. This brings the rotor 29 to the position shown for time $t_1$, where its magnetic domains are aligned with the pole teeth 41 of the phase II stator 33b. Therefore, by the above reasoning, current pulses are applied to the phase I and phase II stators 33a and 33b, causing the rotor 29 again to be stepped through two-thirds of an angle occupied by one of the magnetic domains 31, causing it to reach the position shown in FIG. 3 to exist at time $t_2$, from which it might be advanced to its next rest position by the application of current pulses to the phase II and phase III stators.

The provision of a plurality of poles 41, 43 for each stator is advantageous, in that it improves both the holding power of the stator for a given strength permanent magnet, and also increases the torque exerted by the stator upon the rotor, as compared to what it would be, had the stator only a single pole. Additionally, since there are several magnetic domains interacting at the same time with a given stator, performance of the display device is not seriously affected if, at a given time, fewer than all of the poles of the stator interact with magnetic domains on the rotor. Consequently, it becomes permissible to omit or otherwise alter the characteristics of one of the rotor domains so as to provide a magnetically or electrostatically detectable reference point thereon. Accordingly, in accordance with a feature of the invention as shown in FIG. 2, in the area 55 midway between the magnetic domains 31a and 31b where an additional magnetic domain would normally be located, the rotor is left devoid of such a domain, or, in other words, the magnetic domain is omitted. To permit detection of the reference point thus provided on the rotor, a magnetic pick-off 57 is provided. It includes a pair of poles 58 on opposite sides of the rotor, a magnetic member 59 connecting the poles 58, and a sensing coil 60, wound on the member 59. In each of the rest positions of the rotor 29, the magnetic reluctance of the flux path constituting the magnetic member 59 and its poles 58, will be at a given level which will be relatively low, due to the coupling provided by the magnetic domains 31 disposed between the pick-off poles 58. In a single rest position of the rotor, however; namely, when the domain-free area 55 of the rotor is between the pick-off poles 48, the magnetic reluctance of the pick-off flux path coupled to the sensing coil 60 will be at a higher level due to the lack of coupling between the pick-off poles 58. By means well known to those skilled in the art, the difference can be detected by the sensing coil 60. Such a device is represented by the zero reset control circuit 62, whose output is shown to be applied to the three-phase pulse train generator 53. The circuit 62 may additionally include an automatic reset feature whereby the three-phase pulse train generator 53 is directed to energize the stators 33a–33c, so long as a magnetic domain 31 is sensed by the pick-off 57 and to terminate such pulses when the "missing" domain 55 reaches the pick-off device. It will be understood, of course, that the reference region 55 may differ from the magnetic domain regions of the rotor in other characteristics, such as conductivity. For example, in addition to omitting a magnetic domain, the area which it would normally occupy on the rotor may be made conductive so as to permit it to be sensed by capacitive sensing means.

Figure 4:
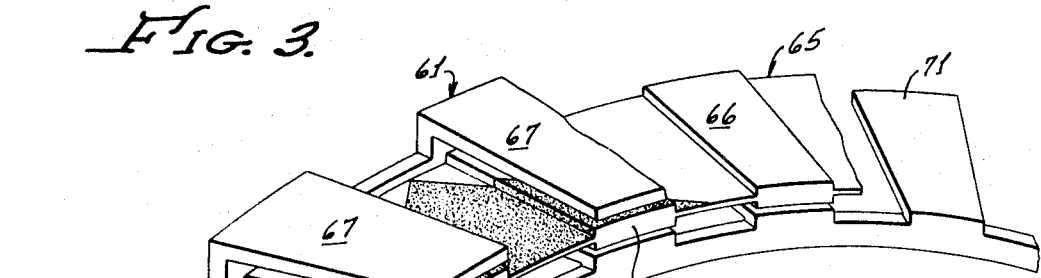
FIG. 4 is a perspective view illustrating schematically one possible configuration which the display device of FIG. 2 may take.
Figure 6:
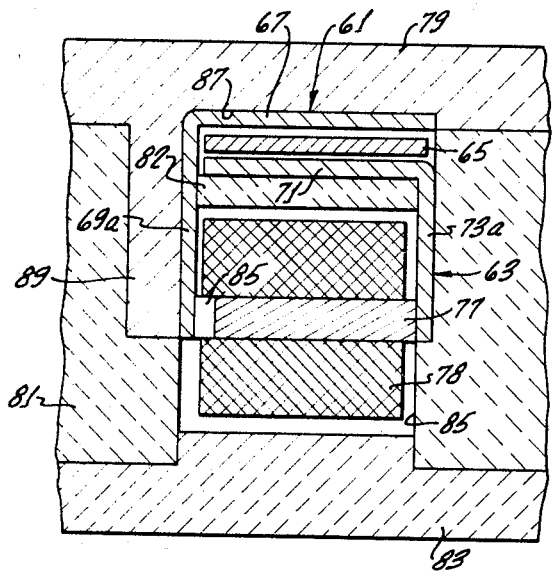
FIG. 6 is a sectional view illustrating in more detail the manner in which the FIG. 4 embodiment of the present invention may be constructed.

Turning now to FIGS. 4 and 6, one preferred embodiment of a display device operating along the principles discussed with reference to FIG. 2 features a substantially flat ring-shaped rotor 65 whose principal plane is at right angles to its axis of rotation, and on which a plurality of magnetic domains 66 are disposed in equally spaced-apart relation, with each domain occupying a segment of the rotor which is equal in size to the segment between adjacent domains. Extending along one face of the rotor 65 is an upper pole piece 61 of magnetic material such as "soft" iron, having a plurality of radially inwardly extending teeth 67, joined by an arcuately extending connecting rib 69. The respective teeth 67 are substantially coextensive with the corresponding magnetic domains 66. Extending along the opposite side of the ring 65 is a lower pole piece 63 of the same material as the upper pole piece and having a plurality of radially outwardly spreading teeth 71 joined by a connecting rib 73 and substantially coextensive with the upper set of teeth 67. Thus, respective pairs of teeth 67 and 71 define a plurality of arcuately extending poles having gaps between them through which the magnetic domains 66 move as the rotor 65 turns. A magnetic field is maintained across each of these gaps by a permanent magnet 75 which is connected by means of a magnetic cross piece 77 to a downwardly extending portion 73a of the lower pole piece connecting member 73 and which is connected to the upper pole piece 61 through a downwardly extending member 69a of its connecting rib 69. Wound around the cross piece 77 is a coil 78 to which current may be applied to modulate the magnetic field imposed across the gaps between the pole pieces 61 and 63 by the permanent magnet 75.

As best seen in FIG. 6, the entire assembly is housed in a plastic pill-shaped casing which includes a plastic body 81, a back 83 and a top 79. For convenience of assembly, the upper and lower pole pieces 61 and 63 are respectively anchored in the top 79 and the body 81 by casting them in place. In this manner, cross members 82 are formed in and of the casing body 81, for supporting the teeth 71 of the lower pole piece 63. The coil 78, the cross piece 77, and the magnet 75 are then placed in their positions within an opening 85 provided for them in the casing body.

With the lower pole piece 63, the coil 78, the cross piece 77, and the magnet 75 in place in the casing body 81, the rotor 65 is placed in position on top of the teeth 71 inside the casing recess 85, after which the casing top 79 carrying the upper pole piece 61 is inserted into the casing body 81. For this purpose, the top 79 is provided with a downwardly extending supporting rib 89 which serves both to lock the top in place in the body 81 and also to support the extension 69a of the upper pole piece 61. Finally, the casing bottom 83 is pushed into place so as to seal the assembly. It will be understood that the remaining two sets of upper and lower pole pieces are distributed in the manner shown schematically in FIG. 2, each occupying approximately 120° of arc. It will also be apparent that several display devices such as the one illustrated in FIGS. 5 and 6 may be housed in a common casing concentrically, in the manner illustrated schematically in FIG. 1.

Figure 5:
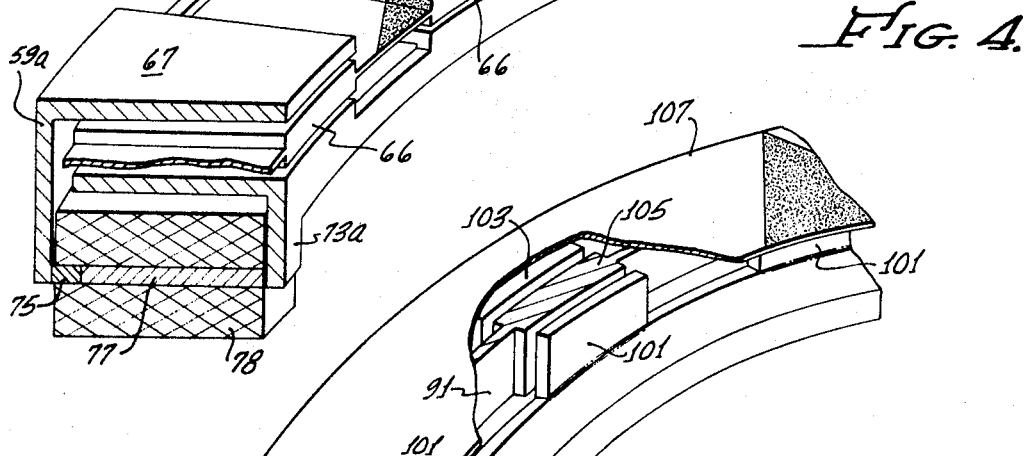
FIG. 5 is a diagram similar to FIG. 4 and showing an alternative configuration for the display device of FIG. 2.
Figure 7:
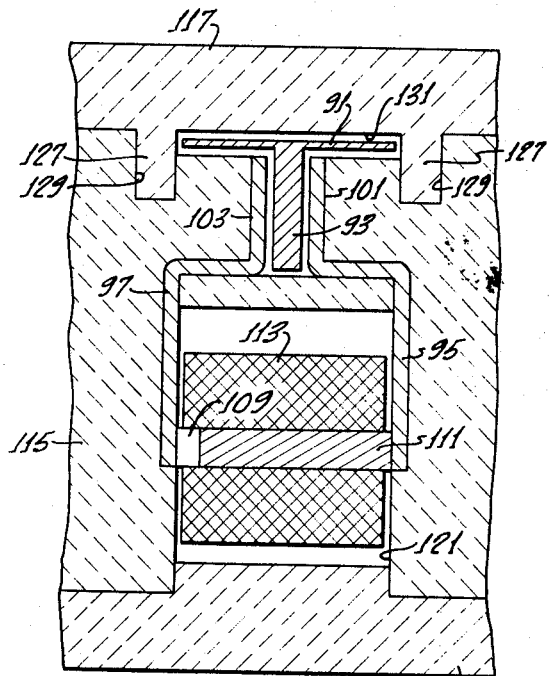
FIG. 7 is a sectional view similarly illustrating in detail the manner in which the FIG. 5 embodiment of the present invention may be constructed.

A second exemplary embodiment of a display device operating on the principles illustrated schematically in FIG. 2 is shown in FIGS. 5 and 7. It differs from the embodiment of FIGS. 4 and 6 primarily in that its rotor 91 is T-shaped in cross-section, with the central leg 93 of the rotor extending parallel to its axis of rotation. Each of the three stators of the device, of which only one is illustrated in FIG. 5, includes an inner pole piece 95 which extends along the inside of the rotor 91 and an outer pole piece 97 which extends along the outside of the rotor. The inner pole piece 95 has an arcuately extending connecting member 99 from which a plurality of spaced-apart teeth 101 extend axially, parallel to the body of the rotor 91. Similarly, the outer pole piece 97 is comprised of a connecting member (not shown) from which a plurality of teeth 103 extend, there being one tooth 103 opposite each of the teeth 101 of the inner pole piece 95, each pair of opposed teeth defining a stator pole 101, 103. Magnetic domains 105 are distributed at equal intervals along the body of the rotor 91, with the length of a given domain corresponding with that of the teeth 101 and 103 and with the spacing between adjacent domains similarly corresponding to the spacing between adjacent ones of the poles 101, 103. For a more convenient display of indicia, the central rotor member 93 is provided with a flat, preferably non-magnetic, cross piece 107.

To establish a magnetic field across the gaps between the respective poles 101, 103, a permanent magnet 109 is placed in a magnetic circuit across the pole pieces 95 and 97 by means of a magnetic cross member 111, around which a coil 113 is wound for modulating the magnetic field across the respective gaps of this stator.

Thus, the rotor 93 provides an example of a display device in which the rotor does not have indicia directly marked on it but instead carries a non-magnetic ring on which the indicia are marked. It should be understood, therefore, that when the phrase, "indicia-carrying rotor" is used herein, it is meant to include a rotor carrying indicia, either directly as in FIG. 4, or indirectly on another ring as in FIG. 5.

To establish a magnetic field across the gaps between the respective poles 101, 103, a permanent magnet 109 is placed in a magnetic circuit across the pole pieces 95 and 97 by means of a magnetic cross member 111, around which a coil 113 is wound for modulating the magnetic field across the respective gaps of this stator.

With the pole pieces case in place, the magnet 109, the cross piece 111, and the coil 113 are placed in position and secured in an opening 121 provided for them in the body 115, after which the bottom 119 is pressed in place. The rotor 91 is then seated between the teeth of the inner and outer pole pieces 95 and 97, after which the casing top 117 is secured in the body 115. For this purpose, the casing body 115 is provided with a pair of annular grooves 127 and the casing top 117 is provided with a pair of annular tongues 129, which fit snugly into the grooves 127, creating a sealed chamber 131 for the rotor 91. It will be noted that a similar sealed chamber is also provided by the arrangement shown in FIG. 6 for its rotor 65.

Figure 8A:
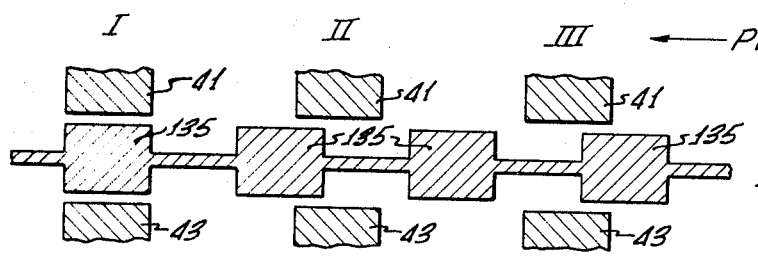
FIGS. 8a-8c illustrate three exemplary configurations of the rotor shown schematically in FIG. 2.
Figure 8B:
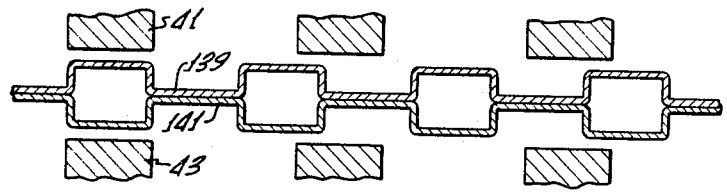
Figure 8C:
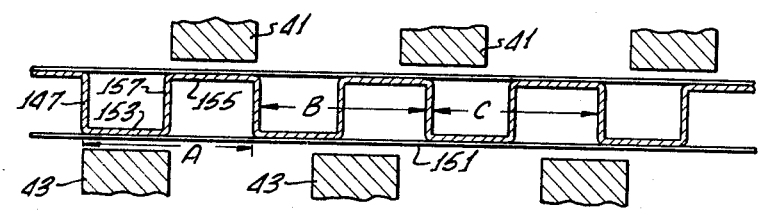

The rotor 29 of the display device illustrated in the foregoing figures may take several alternative forms, three of which are illustrated in FIGS. 8a, 8b, and 8c. For the sake of reference, each of the three stators 31a, 31b, 31c of FIG. 2 is represented by one of its poles 41, 43, located in their proper positions next to the rotor and identified by the phase labels I, II, III.

The rotor illustrated in FIG. 8a in cross section is homogeneously constituted of a magnetic material which may be a magnetic plastic and which has raised or thickened portions 135 serving as the magnetic domains. Thus, it will be seen that the magnetic coupling afforded between the phase I poles 41 and 43 by the thickened rotor portion 135 is much greater than would be the case if the relatively thin portion 137 between adjacent magnetic domains 135 were between those poles. Thus, the effect is the same as if the rotor were of uniform cross section and had intermittent segments of its body made of a magnetic material and the remainder of its body made of a non-magnetic material.

The same principle used for the ring of FIG. 8a is also employed with the rotor illustrated in FIG. 8b and which is shown to be comprised of a pair of corrugated magnetic metal rings 139 and 141, preferably made of "soft" iron, joined together to produce intermittently thick and thin rotor portions 143 and 145, with the thick rotor portions serving as the magnetic domains of the rotor.

Yet another possible embodiment for the rotor of the present invention, illustrated in FIG. 8c, is comprised of a single corrugated magnetic metal ring 147 which may be sandwiched for rigidity between a pair of flat plastic (non-magnetic) rings 149 and 151. In the case of the rotor embodiment of FIG. 8c, each magnetic domain is seen to comprise a pair of oppositely disposed metal sections, such as the sections 153 and 155, and the transversely extending ring portion 157 which connects them. Three magnetic domains of the ring illustrated in FIG. 8c are respectively labeled A, B, and C. Since the essence of a magnetic domain is that it provides magnetic coupling between opposed teeth 41 and 43 of a given pole, it is seen that, because of the peculiar geometry of the magnetic domains illustrated in FIG. 8c, each pair of opposed pole teeth 41 and 43 must be staggered relative to each other along the direction of travel of the ring, so that when one-half of the magnetic domain is proximate one of the pole teeth, the opposite half of the domain is proximate the opposite pole tooth, this being the condition of alignment of the magnetic domain with the pole in which magnetic coupling between the pole and the magnetic domain occurs.

Figure 9:
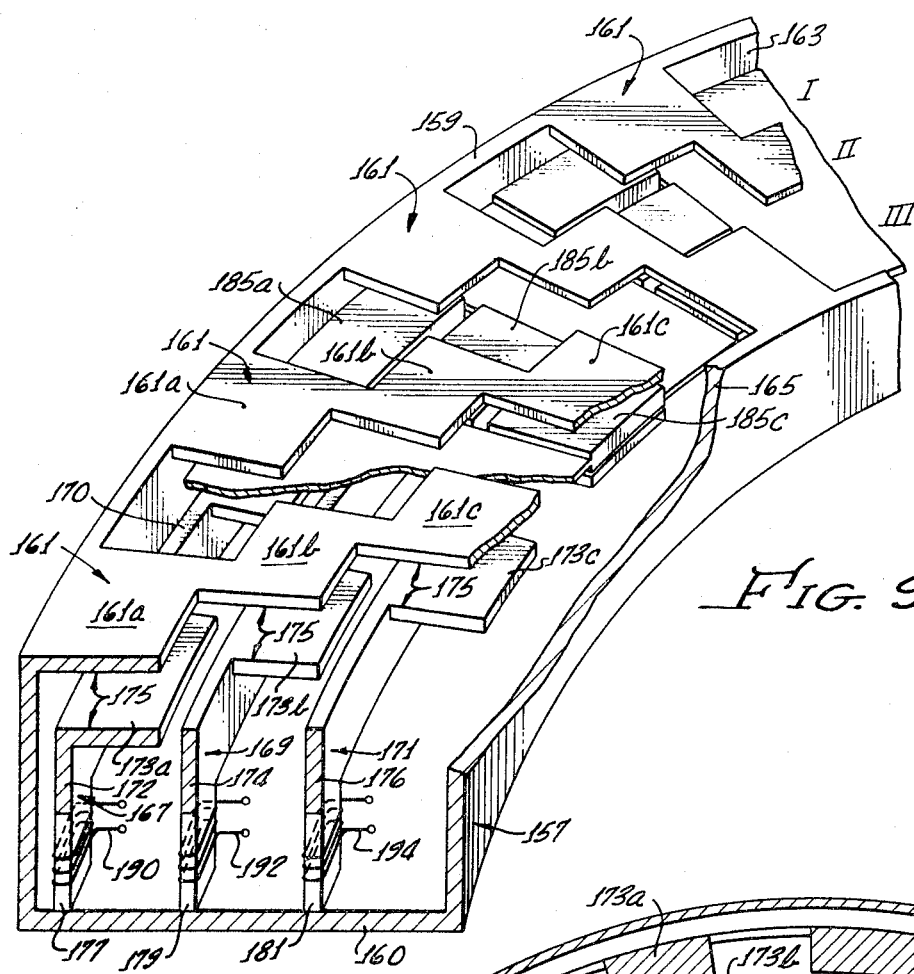
FIG. 9 is a perspective view showing schematically yet another embodiment of the present invention which differs from that illustrated in FIG. 2 primarily in that each of its three stators extends fully around the periphery of its rotor, resulting in a symmetric driving force.

A third exemplary embodiment of the present invention is illustrated in FIGS. 9, 10, 11, and 12. It differs from the previously discussed embodiments principally in that each of its three stators extend fully around its rotor, whereas in the previously discussed embodiments, each stator extends approximately one-third around the periphery of the rotor. As mentioned previously, the principal advantage of the last-to-be-discussed embodiment is that it exerts a purely rotational force upon its rotor. FIG. 9 illustrates schematically a small sector of an exemplary display device incorporating the symmetric three-phase drive principle, as distinguished from the asymmetric three-phase drive principle illustrated in FIG. 2. The exemplary device of FIG. 9 takes the form of a magnetic toroid 157 of rectangular cross section, having an upper wall 159 patterned into a plurality of triple-stepped spokes 161, which extend from the toroid's outer ring 163 to its inner ring 165. The outermost steps 161a of the several spokes serve as a first set of pole teeth for one stator. The middle steps 161b of the spokes serve as a first set of pole teeth for a second stator, and the innermost steps 161c serve as a first set of pole teeth for a third stator of the device. Between the upper wall 159 and the lower wall 160 of the toroidal structure 157, but more closely spaced to the top wall 159, run three coaxial co-planar rings 167, 169, and 171, of magnetic material, respective ones of which serve as the opposite of pole teeth for the first, second, and third stators. Preferably, each of the rings 167, 169, and 171 is configured to have spaced-apart radially extending teeth 173 interconnected by a common rib 170, each tooth being substantially coextensive with a respective one-third of one of the spokes. Thus, the outer one-third 161a of the spokes and the outermost ring 167 form a multi-pole stator having a plurality of arcuately distributed gaps 175, and the same holds true of the remaining portions 161b and 161c of the spokes and their associated rings 169 and 171, so that three co-planar coaxial sets of circularly distributed gaps 175 are created.

The relative phase relationships of the three stators is the same as indicated for FIG. 2. That is, when one stator has its poles aligned with their associated magnetic domains, the other two stators will have their respective poles "leading" and "lagging" their associated sets of domains by two-thirds of a domain.

Each set of teeth 173 associated with a given one of the rings 167, 169, and 171 is connected to the toroidal structure 157 by a flux path of magnetic material which includes a permanent magnet, there being individual magnets 177, 179, and 181 associated with the respective magnetic rings 167, 169, and 171. Means are also provided in the form of coils 190, 192, and 194 wound around the respective members 172, 174, and 176, which provide the aforementioned flux paths for the respective rings 167, 169, and 171, for modulating the magnetic fields applied by the respective magnets 177, 179, and 181 across the gaps 175 of the three concentric stators. Situated in the gaps 175 between the upper and lower sets of pole teeth 161 and 173 is an indicia-bearing ring-shaped rotor 183 having three concentric, radially aligned sets of magnetic domains 185a, 185b, 185c, one set between each set of upper and lower stator poles. Energization of the coils 190, 192, and 194 in a cyclical sequence as illustrated in, and described with reference to, FIG. 3, causes the rotor 183 to be advanced under the same principle as discussed with reference to FIG. 3. The particular rotor illustrated in FIG. 9 is shown segmented in such a way that the magnetic domains 185a, 185b, and 185c associated with the respective stators, are magnetically isolated. This is desirable in order to prevent interaction between the different phases of the device. In construction, the illustrated rotor is similar to that shown in FIG. 8a, being a plastic ring impregnated with magnetic particles and relying on portions having increased thickness to create the magnetic domains 185. It will be understood, of course, that the rotor may take other forms, such as the staggered domain configuration of FIG. 8c, and may be made from other materials as well, such as the metal two-part ring of FIG. 8b.

Figure 10:
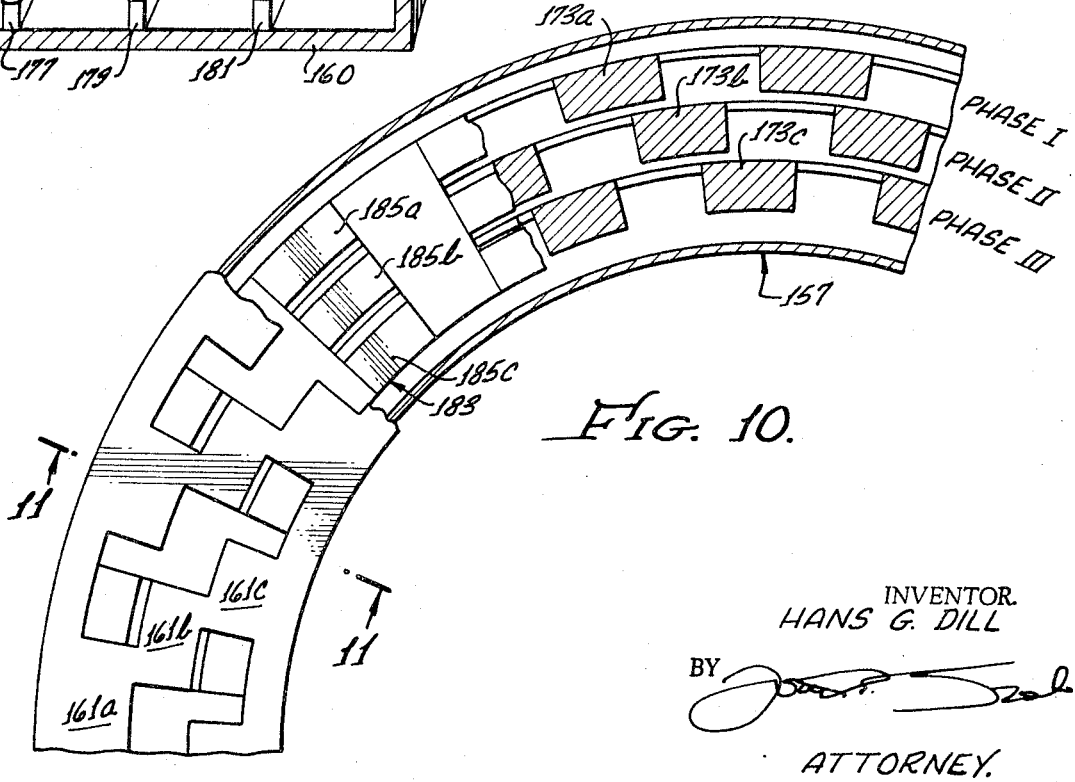
FIG. 10 is a plan view, partially cut away, of the display device illustrated in FIG. 9.

A preferred way of constructing the exemplary three-phase symmetrical drive display device of FIG. 9 is illustrated in FIGS. 10, 11, and 12. Basically, the display device is housed in a plastic pill-shaped casing 187 similar to that illustrated in FIG. 7, and having a body 189, a top 191, and a bottom 193. The toroidal structure 157 is comprised of two parts: a circular-channel bottom member 195 encased in the plastic body 189, and a ring-shaped cap 197 having inner and outer depending flanges 197a and 197b which are spaced snugly to slip onto the bottom member 195, with the cap 197 being held in place in the plastic top 191 between a pair of depending circular flanges 199. Also encased in the plastic body 189 are the three concentric magnetic rings 167, 169, and 171, whose relative positions are staggered in the manner shown in FIG. 9. The radially extending teeth 173a, 173b, and 173c, occupy the floor of an annular recess 200 of rectangular cross section, in which the rotor 183 is contained. Thus, the ring 183 is simply placed inside the annular recess 200, after which the plastic top 191 is pressed into place in the plastic bottom 189.

It will be again noted that by virtue of the depending flanges 199 which are received in grooves 202, the ring is confined in a sealed chamber formed by the plastic body 189 and the top 191.

The arrangement illustrated in FIGS. 10, 11, and 12 differs slightly from that shown schematically in FIG. 9 in that the permanent magnet 177 is magnetically connected between the outer ring 167 and the toroidal body 157 by a magnetic cross piece 203 which extends in the plane of rotation of the rotor 183 and which makes magnetic contact with the inner wall 196 of the bottom member 195, rather than with its floor, as illustrated in FIG. 9. Functionally, it is immaterial whether the magnetic circuit is established with the floor or the wall of the toroidal structure 157 and the arrangement illustrated in FIGS. 10–12 is superior in that it permits convenient placement of the coil 190 through a window 204 provided for that purpose in the floor of the bottom member 195 of the toroidal structure 157. Indeed, there are three such openings in the bottom magnetic member 195, one for each of the three coils 190, 192, and 194, which are placed in positions as shown in FIG. 12 and for which respective cavities 201 are provided in the bottom of the plastic body 189, as best seen in FIG. 11.

To complete the magnetic circuit between the permanent magnet 177 and the magnetic ring 167, the latter is provided with a depending arm 172 corresponding to the similarly numbered magnetic member illustrated in FIG. 9, which contacts the permanent magnet 177. Consequently, a magnetic flux path is formed for the permanent magnet 177 which includes two branches; one branch indicated by the line $\phi_1$ extends up through the depending arm 172, the inwardly extending tooth 173a of the outer ring 167, the magnetic domain 185a, and the magnetic flanged top 197, then down through the outer wall, then radially inward along the floor of the magnetic channel member 195, then up through the inner wall 196 of that member, aand finally back to the magnet through the magnetic cross piece 203. The other branch of the flux path, indicated by the line $\phi_2$, also extends through the elements 172, 173a, 185a, and 197, but then returns down the inner wall 196 of the magnetic channel member to the magnetic cross piece 203. Similar flux paths exist for the permanent magnets 179 and 181 (not shown in FIGS. 10–12). The only difference between the latter two flux paths and that just described for the permanent magnet 177 is that the downwardly extending fingers 174 and 176 associated with the second and third magnetic rings 169 and 171 slope radially outwardly as shown in FIG. 12 as they extend downward into contact with the permanent magnets 179 and 181, respectively.

It is apparent that the display device which has been disclosed herein has many applications and advantages. It may be used to display several channels of information side by side and these channels may be related or unrelated. The type of information capable of display is virtually unlimited and includes, for example, vehicle speed, elapsed miles, fuel level, and oil pressure in an automobile, time in a watch or clock, and many other types of data, regardless of whether or not they are continually variable or subject to change at only infrequently occurring periods.

The subject display device is inherently rugged, since there are no mechanical linkages between moving parts. It is accurate, since it operates basically on a digital principle; inexpensive to manufacture, since its read-out is basically mechanical, and highly resistant to magnetic fields because of the shielding effect of its stators.

I claim:

1. A display device comprising in combination
   a. an indicia-carrying ring rotor having a plurality of magnetic domains;
   b. three multi-pole electrically wound stators magnetically coupled to said domains, poles of a given stator being concurrently aligned with a corresponding plurality of said domains, poles of the respective stators being successively aligned with domains of said rotor at successive positions of said rotor;
   c. means for magnetizing said stators; and
   d. means for modulating the magnetization of said stators through three cyclically recurring phases.

2. The display device of claim 1 characterized further in that each said stator contains a plurality of arcuately distributed gaps through which said rotor domains pass as said rotor turns and is magnetically coupled to a permanent magnet so as to normally establish a magnetic field across said gaps and to an electric winding for modulating said magnetic field.

3. The display device of claim 2 characterized further in that each said stator extends along approximately one-third of the periphery of said rotor.

4. The display device of claim 2 characterized further in that said rotor is comprised of three concentric ring portions, each carrying an individual set of magnetic domains and respective ones of said stators extend around the full periphery of respective ones of said ring portions.

5. The display device of claim 4 characterized further in that each said stator includes first and second sets of pole pieces distributed in a circular array, said sets being spaced apart so as to receive said rotor between them, each pole piece in the first set of a stator being opposite a corresponding pole piece in the second set of that stator.

6. The display device of claim 5 characterized further in that the first set of pole pieces of all three of said stators are formed from a single ring of magnetic material having a plurality of three-stepped spokes extending generally radially between inner and outer rim portions of said ring of magnetic material.

7. The display device of claim 3 characterized further in that each said stator includes a pair of arcuate magnetic members with mutually opposite sets of pole teeth pole teeth of each said member being spaced apart by the same distance as the spacing between adjacent ones of said magnetic domains.

8. The display device of claim 1 characterized further in that said domains are spaced apart equally around the periphery of said rotor, one of said domains being different from the other domains sufficiently to be magnetically identifiable therefrom, to permit a predetermined location of said rotor to be detected magnetically.

9. The display device of claim 8 characterized further in that it includes additionally a magnetic pick-off adjacent said rotor for detecting the presence of said different domain.

10. The display device of claim 8 characterized further in that said different domain differs from the remaining domains in that it is substantially non-magnetic.

11. The display device of claim 1 characterized further in that said domains are uniformly spaced around the periphery of said ring, except that one domain is omitted and characterized further in that a magnetic pick-off next to said rotor is provided for detecting a predetermined position of said rotor by the absence of said domain.

12. The display device of claim 1, characterized further in that each said stator is configured to define a plurality of arcuately distributed gaps and in that said means for magnetizing said stators includes for each stator a permanent magnet and a magnetic member coupled between said magnet and said stator to apply the magnetic field of said magnet across all gaps of said stator.

13. The display device of claim 12 characterized further in that said means for modulating includes a coil wound around said magnetic member.

14. The display device of claim 1, characterized further in that said rotor is comprised of a ring of uniformly magnetic material whose cross-section deviates at intervals along its circumference in order to create said magnetic domains.

15. The display device of claim 1 characterized further in that said rotor is comprised of a ring of uniformly magnetic material corrugated to create said magnetic domains.

16. A display device comprising in combination
a. an indicia-carrying ring rotor having a plurality of magnetic domains;
b. a plurality of multi-pole stators magnetically coupled to said domains, poles of a given stator being concurrently aligned with a corresponding plurality of said domains, poles of the respective stators being non-concurrently aligned with the domains of said rotor, each said stator extending fully around the periphery of said rotor;
c. means for steadily magnetizing said stators; and
d. means for individually modulating the magnetization of each said stator.

17. The display device of claim 16 characterized further in that said stators comprise a toroidal ring of magnetic material in which said ring is rotatably disposed.

18. A display device comprising in combination
a. a rotor having a plurality of magnetic domains;
b. three multi-pole stators magnetically coupled to said domains, poles of a given stator being concurrently aligned with a corresponding plurality of said domains, poles of the respective stators being aligned with domains of said rotor at every third successive position of said rotor;
c. means for steadily magnetizing said stators; and
d. means for individually modulating the magnetization of said stators.

19. The display device of claim 18 characterized further in that said means for steadily magnetizing said stators includes a permanent magnet for each of said stators and in that said means for modulating the magnetization of said stators includes for each said stator a coil wound thereon.

20. A display device comprising in combination
a. an indicia-carrying ring rotor carrying a plurality of magnetic domains;
b. three stators extending along the periphery of said ring, each stator including
 1. magnetic members defining a plurality of arcuately distributed gaps through which said domains pass as said rotor turns;
 2. means including a permanent magnet and a magnetic means for providing a flux path between said magnet and said magnetic members for simultaneously imposing a magnetic field by means of said magnet across all of the gaps of said stator; and
 3. means for simultaneously modulating the magnetic field imposed across all of the gaps of said stator by said permanent magnet.

21. The display device of claim 20 characterized further in that said domains are uniformly distributed along said rotor and in that for each stator its gaps are so spaced that they all become simultaneously aligned with a corresponding number of said magnetic domains, said stators being so spaced relative to each other that the domains of said rotor reach alignment with the gaps of the respective stators in a cyclically recurring succession.

22. The display device of claim 20 characterized further in that said means for simultaneously modulating includes an electric coil wound around a portion of said magnetic means.

* * * * *